US012269065B1

(12) United States Patent
Fennenkötter et al.

(10) Patent No.: US 12,269,065 B1
(45) Date of Patent: Apr. 8, 2025

(54) SIEVING MACHINE WITH INSERTABLE SIEVE TRAY ELEMENTS

(71) Applicant: HAVER NIAGARA GMBH, Münster (DE)

(72) Inventors: Klaus Fennenkötter, Münster (DE); Matthias Grönefeld, Coesfeld (DE); Ulli Stadtmann, Sendenhorst (DE)

(73) Assignee: Haver NIAGARA GmbH, Münster (DE)

( * ) Notice: Subject to any disclaimer, the term of this patent is extended or adjusted under 35 U.S.C. 154(b) by 0 days.

(21) Appl. No.: 18/837,356

(22) PCT Filed: Feb. 7, 2023

(86) PCT No.: PCT/EP2023/052969

§ 371 (c)(1),
(2) Date: Aug. 9, 2024

(87) PCT Pub. No.: WO2023/152123

PCT Pub. Date: Aug. 17, 2023

(30) Foreign Application Priority Data

Feb. 11, 2022 (DE) ..................... 10 2022 103 295.7

(51) Int. Cl.
*B07B 1/46* (2006.01)
*B07B 1/28* (2006.01)

(52) U.S. Cl.
CPC .............. *B07B 1/4645* (2013.01); *B07B 1/28* (2013.01)

(58) Field of Classification Search
CPC ............ B07B 1/4645; B07B 1/28; B07B 1/40
See application file for complete search history.

(56) References Cited

U.S. PATENT DOCUMENTS

| | | | | |
|---|---|---|---|---|
| 2010/0044281 | A1 | 2/2010 | Johnson et al. | |
| 2013/0037459 | A1 | 2/2013 | Woodgate et al. | |
| 2014/0086706 | A1 | 3/2014 | Lane et al. | |
| 2017/0080462 | A1 | 3/2017 | Freissle et al. | |
| 2019/0224721 | A1 * | 7/2019 | Persson | F16B 33/006 |

FOREIGN PATENT DOCUMENTS

| | | | |
|---|---|---|---|
| BE | 507106 | A | 11/1951 |
| EP | 2505271 | A1 | 10/2012 |
| WO | 2005123278 | A2 | 12/2005 |
| WO | 2009078786 | A1 | 6/2009 |

OTHER PUBLICATIONS

International Search Report and Written Opinion mailed May 8, 2023 in related/corresponding International Application No. PCT/EP2023/052969.

Search Report created Jul. 8, 2022 in related/corresponding DE Application No. 10 2022 103 295.7.

* cited by examiner

*Primary Examiner* — Jacob S. Scott
*Assistant Examiner* — Miraj T. Patel
(74) *Attorney, Agent, or Firm* — PATENT PORTFOLIO BUILDERS PLLC

(57) ABSTRACT

A sieving machine has a sieve deck and a number of insertable sieve tray elements attached to cross-beams of the sieving machine by a mounting system. The mounting system includes longitudinal beams mounted on the cross-beams and a number of support slats extending along the longitudinal beams and with which the sieve tray elements engage. The support slats have a U-shaped cross-section and are fitted over the longitudinal beams. Hooks are formed on the longitudinal beams engage in the support slats to fasten the support slats to the longitudinal beams in a form-fitting manner.

15 Claims, 8 Drawing Sheets

SIEVING MACHINE WITH INSERTABLE SIEVE TRAY ELEMENTS

BACKGROUND AND SUMMARY OF THE INVENTION

Exemplary embodiments of the invention relate to a sieving machine, in particular a vibrating sieving machine, having at least one sieve deck that has a plurality of insertable sieve tray elements which are fastened to cross-beams of the sieving machine by means of a mounting system, wherein the mounting system comprises longitudinal beams which are mounted on the cross-beams, and a plurality of support bars which extend along the longitudinal beams and with which the sieve tray elements are latched.

Vibrating sieving machines, also known as "vibratory sieving machines", are used, for example, for classification, pre-separation, dewatering, or foreign matter screening.

Particularly in sieving machines with a large sieve deck, the surface area of which can exceed several square meters, a sieve tray consisting of a large number of plug-in sieve tray elements is often used. For example, a mounting system is known on the market in which a plurality of parallel longitudinal beams are mounted on cross-beams of a sieve box of the sieving machine. Steel profiles with a rectangular cross-section are used as longitudinal beams, for example, which are provided with a groove extending in the longitudinal direction on their upper side, so that a roughly C-shaped profile is ultimately created. A plastic strip is inserted into the groove, which has a mushroom-shaped profile at the top, for example. Sieve tray elements are placed on top of this profile, which are typically made of a plastic with openings on the surface for the screened material to pass through. The sieve tray elements are pressed onto the mushroom-head profiling of the plastic strips with corresponding receptacles and thus fixed to them. Screening can take place directly through the openings in the sieve tray units. Alternatively, an additional screening surface can be applied, for example a wire mesh, which is attached to a surrounding frame and tensioned. Sieve tray elements are also known which consist of a plastic frame with a cast-in wire mesh.

This system has established itself in principle, but has some shortcomings. The plastic strips usually have a length that is in the range of the length of a sieve tray element and therefore approximately one meter. The plastic strips can be damaged when installing the sieve tray elements and especially when removing the sieve tray elements for inspection or replacement. Even if only a short section is damaged, it is then necessary to replace an entire strip, which is both labor-intensive and unnecessarily expensive. A further disadvantage is that the plastic strips can only be inserted into the groove of the longitudinal beams with considerable force-usually by hammering them in with a hammer. This is generally, and especially with a lower sieve deck, a strenuous and injury-prone task.

There is also a risk of gaps remaining between two adjoining plastic strips, through which screenings can get into the metal strips with the rectangular profile, which are used as longitudinal beams, and which destroy the strips abrasively from the inside when the vibrating screen moves.

Exemplary embodiments of the present invention are accordingly directed to a sieving machine of the type mentioned at the beginning, in which assembly of the vibrating sieve elements is improved in such a way that replacement of components is easier and possibly less material-intensive and that the components used are better protected against abrasive wear by the material to be screened.

A sieving machine according to the invention of the type mentioned at the beginning is characterized in that the support bars have a U-shaped cross-section and are fitted over the longitudinal beams, wherein hooks are formed on the longitudinal beams which engage in the support bars, thereby fastening the support bars to the longitudinal beams in a form-fitting manner.

As the support bars have a U-shaped cross-section, they can be slipped over the longitudinal beams and thus protect the longitudinal beams from abrasion by the screenings. Unlike pressing the support bars into the longitudinal beams, for example, engaging in hooks allows simple and non-destructive disassembly and thus opens up the possibility of easily replacing the support bars if they are damaged.

The support bars have a continuous or interrupted latching profile, for example a mushroom head profile, at the top for latching and/or clamping the sieve tray elements.

In an advantageous design of the sieving machine, the longitudinal beams are made from a sheet metal, wherein the hooks are cut free from the sheet metal at an upper edge of the longitudinal beams. The hooks can thus be easily and integrally formed with the longitudinal beams. Production from sheet metal, e.g., in a punching or laser cutting process, is also cost-effective. For stability reasons, the longitudinal beams can be made from two or more sheets arranged parallel to each other or vary in height.

Preferably, a plurality of hooks are provided on a longitudinal beam, which are arranged one behind the other at regular intervals in the longitudinal direction of the longitudinal beam. There are then a correspondingly large number of force transmission points between a support bar and a longitudinal beam, which means that correspondingly large forces can be transmitted evenly distributed. The resulting connection between the two elements is resilient and material fatigue is prevented, which could otherwise occur if the forces acting at one point are too high.

In a further advantageous design of the sieving machine, the longitudinal beams have a length which lies in the range of the distance between two cross-beams of the sieving machine, wherein the longitudinal beams each rest in a central section on one of the cross-beams in each case. Such longitudinal beams, which do not extend over the entire length of the sieve box, are easier to manufacture, transport and replace. The distance between two cross-beams can be in the region of one meter, for example, so that the longitudinal beams are also approximately this length. Alternatively, it is also possible to use longer longitudinal beams, possibly up to the length of the entire sieve deck, which can be several meters. This can be advantageous for cost reasons.

In a further advantageous design of the sieving machine, the support bars have side cheeks with which they rest against the outer sides of the longitudinal beams, wherein projections are formed on the inner sides of the side cheeks, which projections engage in the hooks. To mount the support bar on the longitudinal beam, the support bar is positioned so that the projections are located between the hooks of the longitudinal beam. In this position, the support bar is pressed down until it rests on the inside on the top of the hooks. The support bar is then moved against the opening direction of the hooks on the side rail, with the projections engaging in the undercuts of the hooks.

Preferably, the support bars are made of plastic and have a length of less than 30 centimeters (cm), which means that they can be manufactured easily and cost-effectively as molded parts using a plastic injection molding process. The fact that the support bars are relatively short means that damaged sections can be replaced easily and with little loss of material.

In a further advantageous design of the sieving machine, it is provided that a wedge element is attached to at least one of the support bars. The wedge element is also placed on one of the longitudinal beams and engages with a vertically aligned wedge between two hooks. Preferably, support bars and wedge elements alternate along a longitudinal beam. The wedge element prevents the projections of the support bars from moving out of the undercuts of the hooks. The support bar is thus wedged by the wedge element in such a way that it is fixed to the longitudinal beam in all directions. The subsequently mounted sieve tray units then prevent the wedge elements from moving upwards, so that the entire mounting system is positively secured to the longitudinal beams with the sieve tray unit in place. Preferably, the support bars are moved in the direction of the material flow on the sieve tray for assembly. The forces to be absorbed by the wedge element for securing are low in this way.

In a further advantageous design of the sieving machine, an overlap strip is formed on each of the side cheeks of the support bars and optionally also on the side cheeks of the wedge elements, which covers a gap to an adjacent support bar or possibly an adjacent wedge element. This prevents screenings or even water in the area of the transitions between adjacent support bars or wedge elements from getting between them and the longitudinal beams, thus providing the best possible protection for the longitudinal beams.

In a further advantageous design of the sieving machine, the longitudinal beams are attached to the cross-beams by means of bonding. The bonding is preferably carried out on the side walls of the cross-beams.

Bonding is advantageous as it does not weaken the cross-beam. In addition, if the mounting profiles are fastened purely by riveting or screwing, micro-movements between the cross-beams and the mounting profiles can occur as a result of the sieve movement, which in the long term leads to damage to the usual corrosion protection layer and thus to corrosion at the fastening points. These detrimental micro-movements are effectively prevented by adhesive bonding. By adhesively bonding the mounting profiles to the side cheeks of the cross-beams, only shear forces act on the bonding surface during operation of the sieving machine, which means that the longitudinal beams can be securely fastened with the adhesive bond.

The mounting system described can preferably be used with sieving machines that are designed as vibrating sieving machines.

BRIEF DESCRIPTION OF THE DRAWING FIGURES

The invention is explained in more detail below with reference to exemplary embodiments with the aid of figures. The figures show as follows:

FIG. 1*a* shows a vibrating sieving machine in a schematic isometric overall view;

FIG. 1*b* shows a section of FIG. 1*a* in an enlargement;

Figure 6:
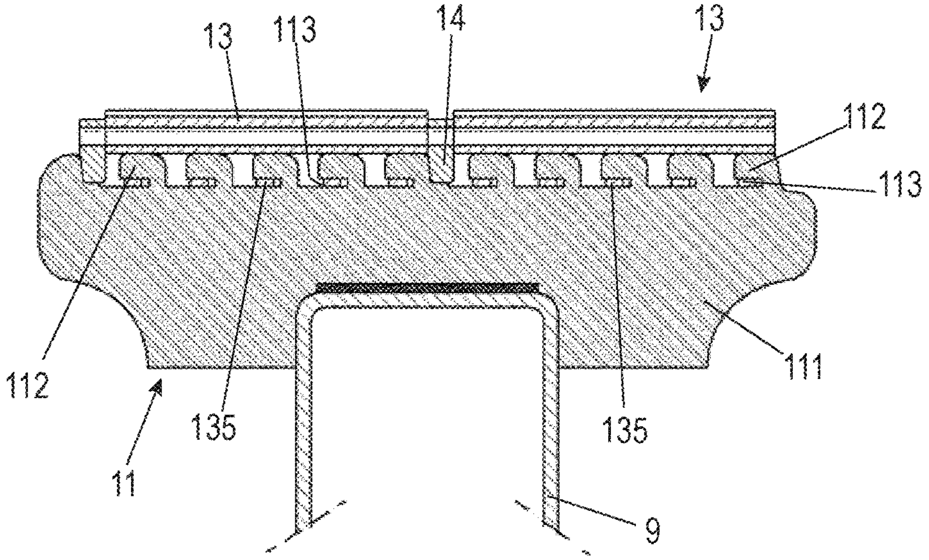
FIG. 6 shows a schematic sectional view of a section of a mounting system for a sieve tray.
Figure 7A:
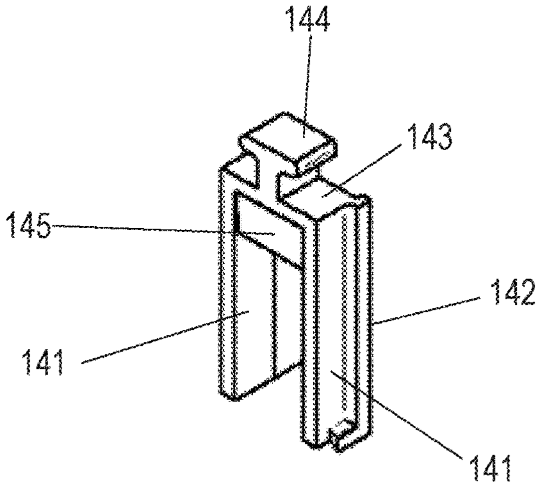
Figure 8A:
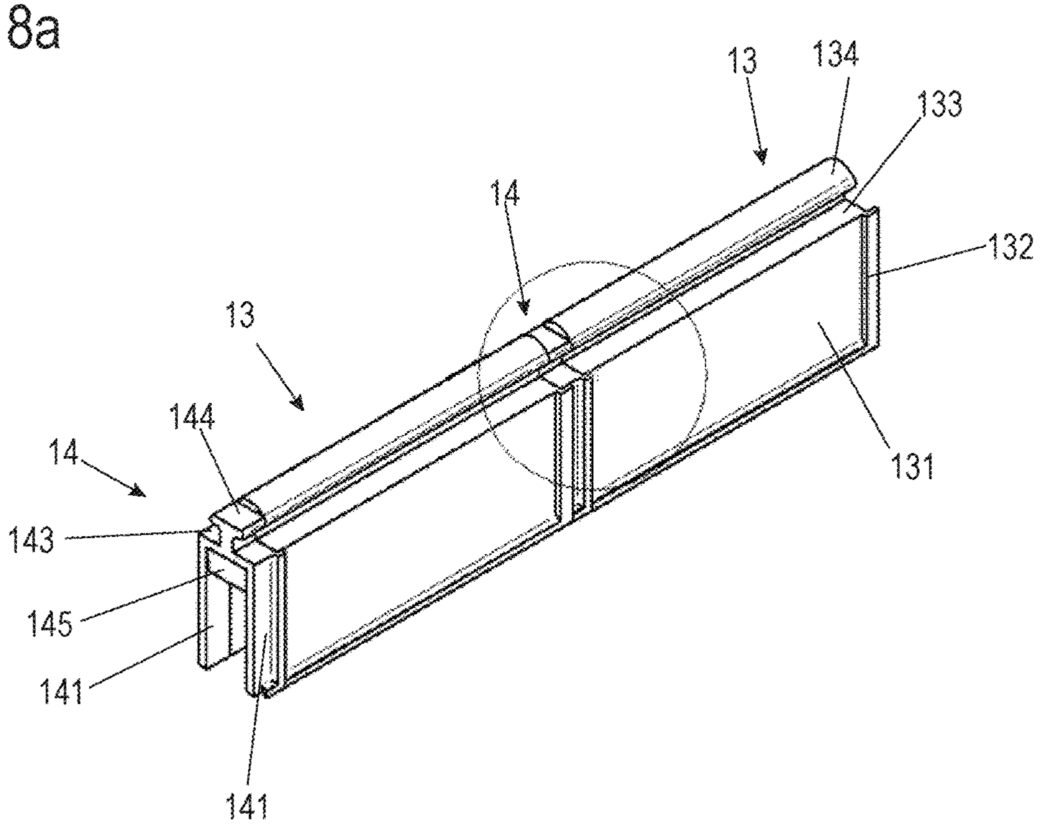
Figure 8B:
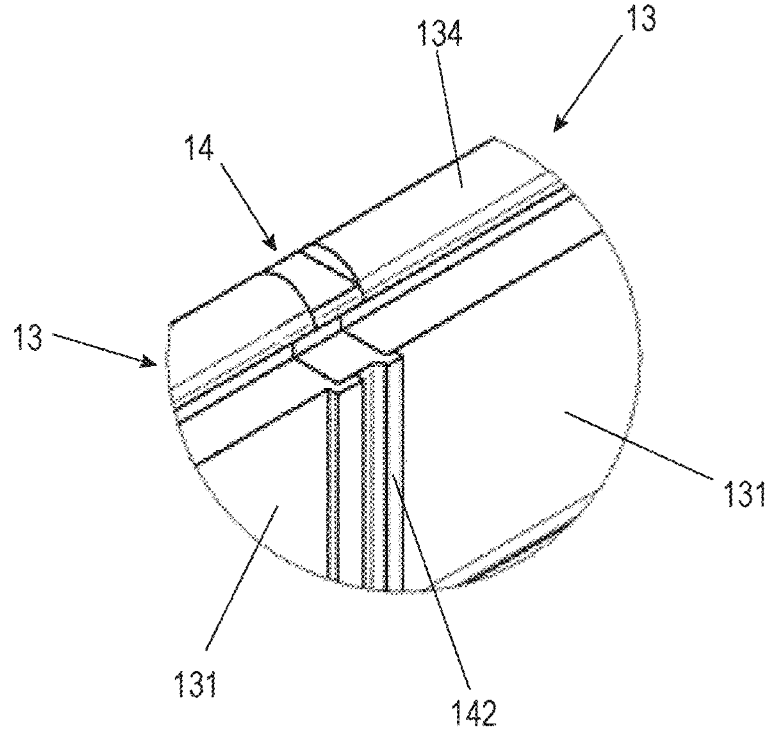
Figure 8C:
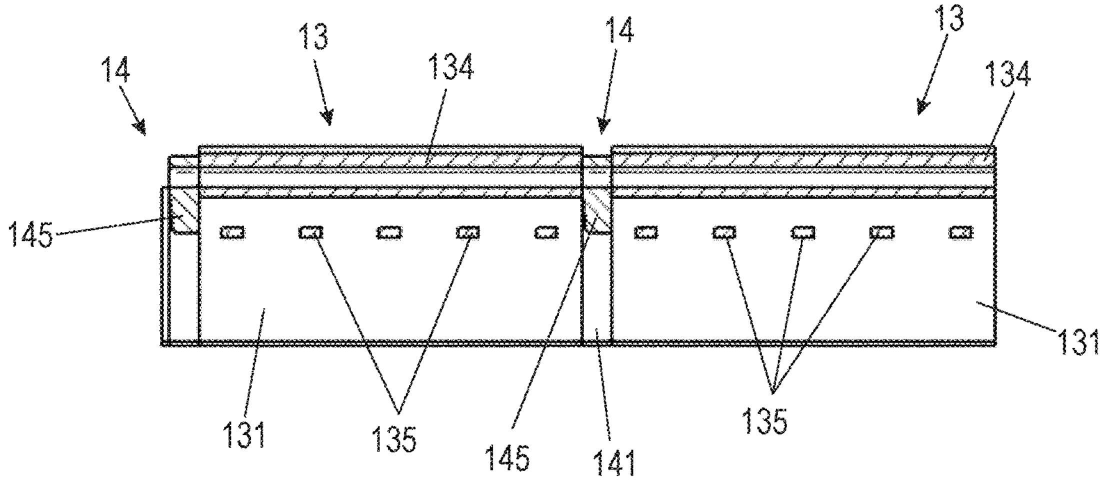

FIGS. 7*a, b* show in each case an isometric view of two components of the mounting system according to FIG. 6;

FIGS. 8*a-c* show different views of the components from FIGS. 7*a, b* in an assembled state.

DETAILED DESCRIPTION

Figure 1A:
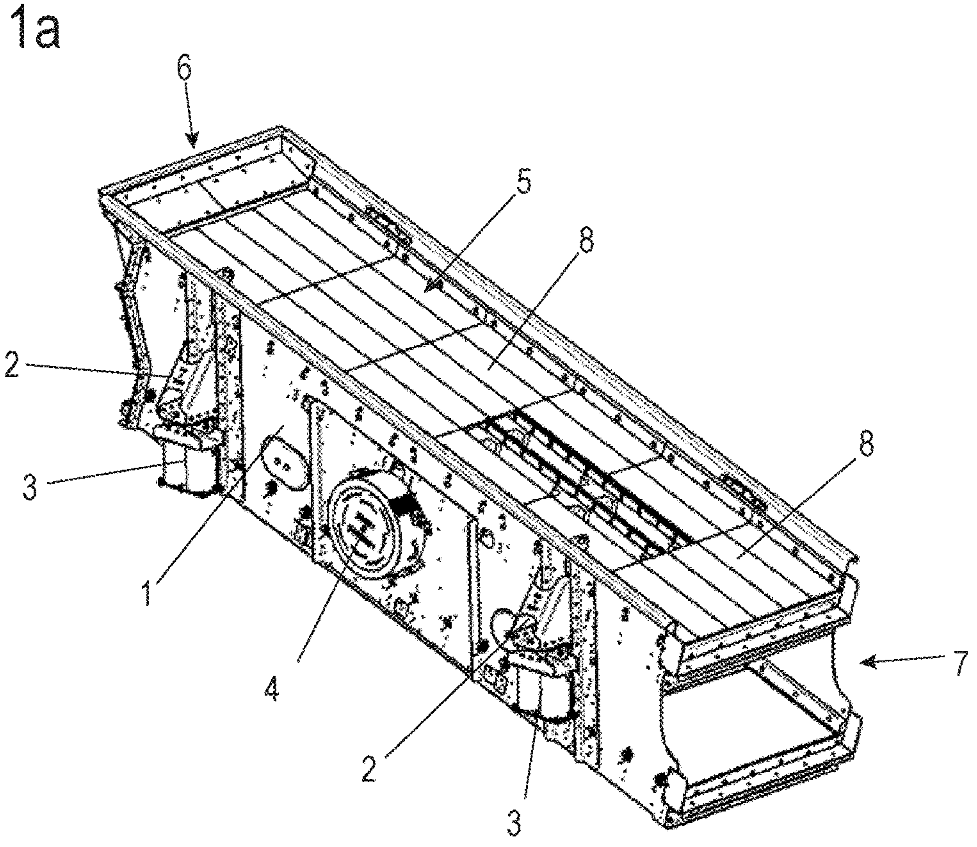

FIG. 1*a* shows an exemplary embodiment of a vibrating sieving machine in an isometric overview.

The vibrating sieving machine is mounted on a frame-like support frame, not shown here, which in turn is mounted on a base or sub-frame, also not shown here. The support frame is tilted in a known and customary manner with respect to the horizontal in order to support material transport through the vibrating sieving machine.

The vibrating sieving machine itself comprises a sieve box 1, which has two brackets 2 on both sides. With these brackets 2, the sieve box 1 is mounted on spring assemblies 3. In other designs of the vibrating sieving machine, the number of brackets 2 and spring assemblies 3 can also be greater than two on each side. In this example, the spring assemblies 3 are each formed by two resilient rubber dampers. In addition to the rubber dampers shown here, metal springs can also be used additionally or alternatively.

During operation, the sieve box 1 as a whole is vibrated in the usual circular, elliptical, or linear manner, in this exemplary embodiment by means of an eccentric drive 4. Alternatively, other drives are possible. The sieve box 1 is bounded at the top by a sieve deck 5. During operation of the sieving machine, screenings are fed onto this sieve deck 5 in a feed area 6 and leave the sieving machine at the opposite end in a discharge area 7 or fall downwards out of the sieve box 1. The sieving machine shown here has two sieve decks arranged one above the other, wherein only the discharge area of the lower one is visible.

In alternative designs, only one sieve deck may be present in the sieve box 1 or more than two sieve decks may be arranged one above the other, allowing finer screening in stages.

The sieve deck 5 has a sieve tray, which in this case consists of a plurality of sieve tray units 8 arranged next to and behind one another. These sieve tray units 8 have openings through which the screening takes place. The use of a plurality of sieve tray units 8 makes it easier to replace a damaged or worn area of the sieve tray, in contrast to a continuous sieve tray, e.g., formed from a perforated plate or a grid, which is in one piece or composed of only a few parts.

In a central area of the sieve deck 5, some of the sieve tray units 8 have been removed. This area of the sieving machine is shown enlarged in FIG. 1*b*. In the magnification, a mounting system 10 can be seen that supports the sieve deck units 8 along their longitudinal sides and to which the sieve deck units 8 are attached. This mounting system 10 is explained in more detail in the following figures.

Figure 1B:
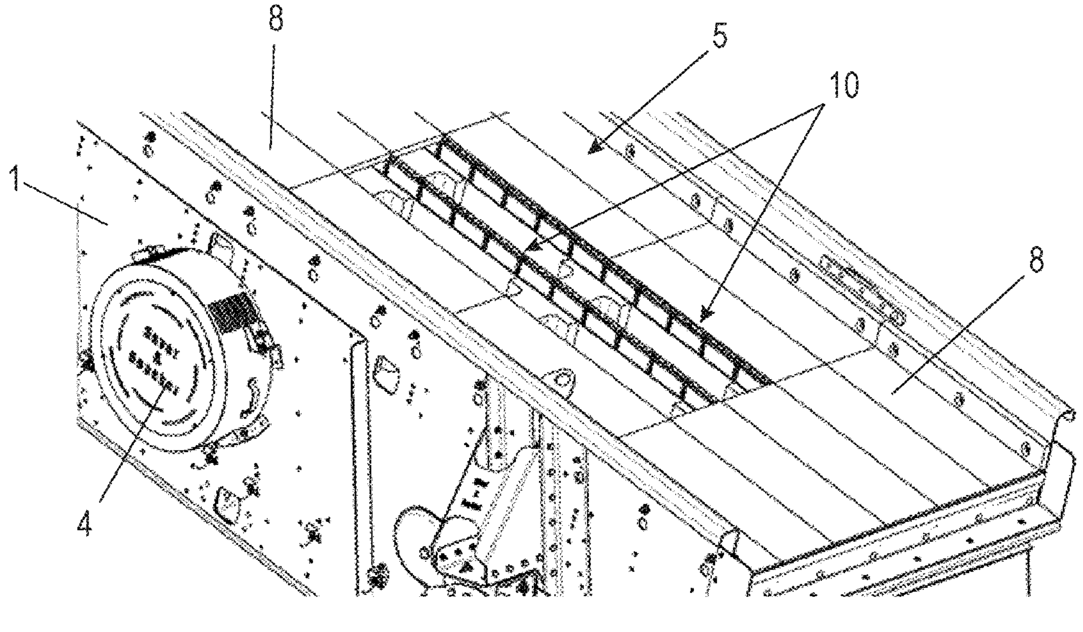
Figure 2:
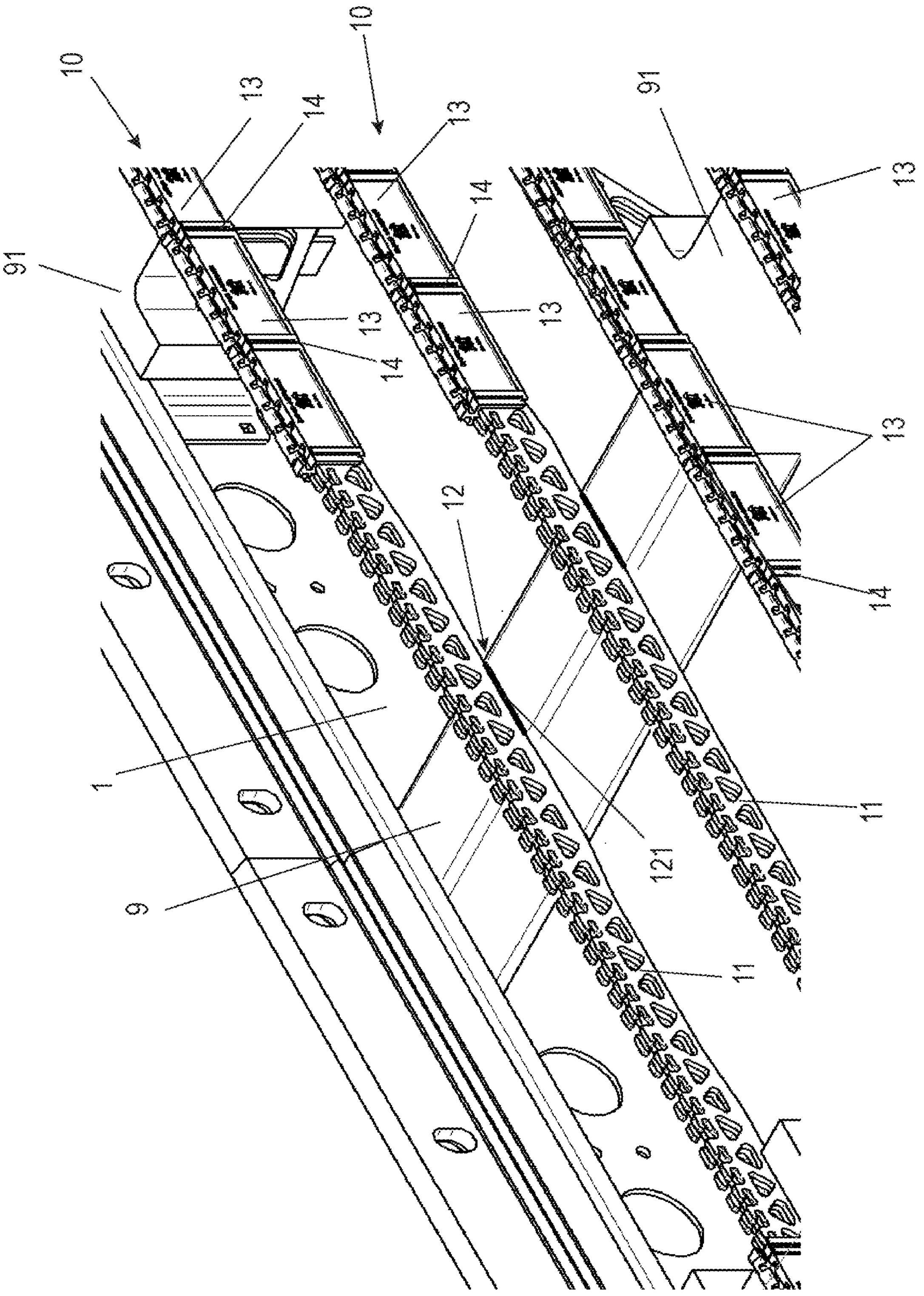
FIG. 2 shows an isometric detailed view of a section of a vibrating sieving machine with dismantled sieve tray and partially dismantled mounting system of the sieve tray.

FIG. 2 shows a section of a sieving machine, for example the one shown in FIGS. 1*a* and 1*b*. Identical reference signs in all figures indicate identical or similarly acting elements.

Sieve tray units (see reference sign 8 in FIG. 1*a, b*) are not mounted in the section shown in FIG. 2. This allows an insight into the interior of the sieve box 1 and the mounting system 10 for such sieve tray units. The mounting system is not fully assembled everywhere in order to better illustrate its various components.

The mounting system 10 comprises longitudinal beams 11, which are mounted with a U-shaped cut-out on a cross-beam 9 of the sieve box 1. The longitudinal beams 11 are not continuous elements over the entire length of the sieve box, but extend on both sides of the cross-beam 9 to approximately the middle of the distance to the next cross-beam 9.

The next of the cross-beams 9 is not directly visible in FIG. 2. It is located under a cover 91, which is also present in sections on the visible cross-beam 9. The cover 91 is preferably made of an impact- and abrasion-resistant material, for example a plastic, and is slipped over the cross-beams 9 in sections in order to prevent damage to the cross-beam 9 by falling screenings.

The fact that the longitudinal beams 11 do not extend along the entire sieve box 1, but only cover the area around a cross-beam 9, makes them easier to manufacture, transport and replace. The longitudinal beams 11 are attached to the cross-beams 9 with a fastening 12. In the example shown, the longitudinal beams 11 are welded to the cross-beams 9 in weld seams 121.

In the example shown, each of the longitudinal beams 11 is made from two metal sheets arranged parallel to each other. The metal sheets can be formed over the entire surface; for reasons of weight saving, openings can be advantageously provided, as can also be seen in the example in FIGS. 2 and 3.

Plastic elements are placed on the longitudinal beams 11, which then support the sieve tray units, see reference signs 8 in FIGS. 1*a*, 1*b*. Support bars 13 and wedge elements 14 are used alternately. To attach the support bars 13 and wedge elements 14 to the longitudinal beams 11, an undercut profile is formed on their upper edge, specifically by hooks 112 in the example shown. The attachment of the support bars 13 and wedge elements 14 to the longitudinal beams 11 is explained in more detail below in connection with FIGS. 6-8*c*.

Figure 3:
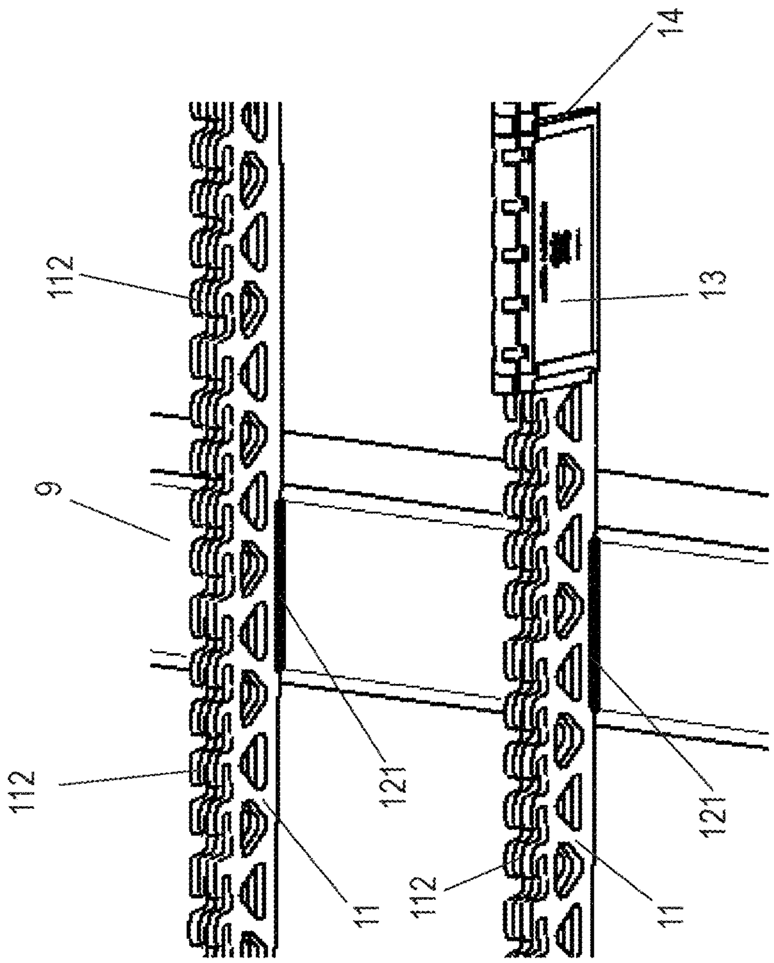
FIG. 3 shows a detailed view of a section of FIG. 2 from a different angle.
Figure 4:
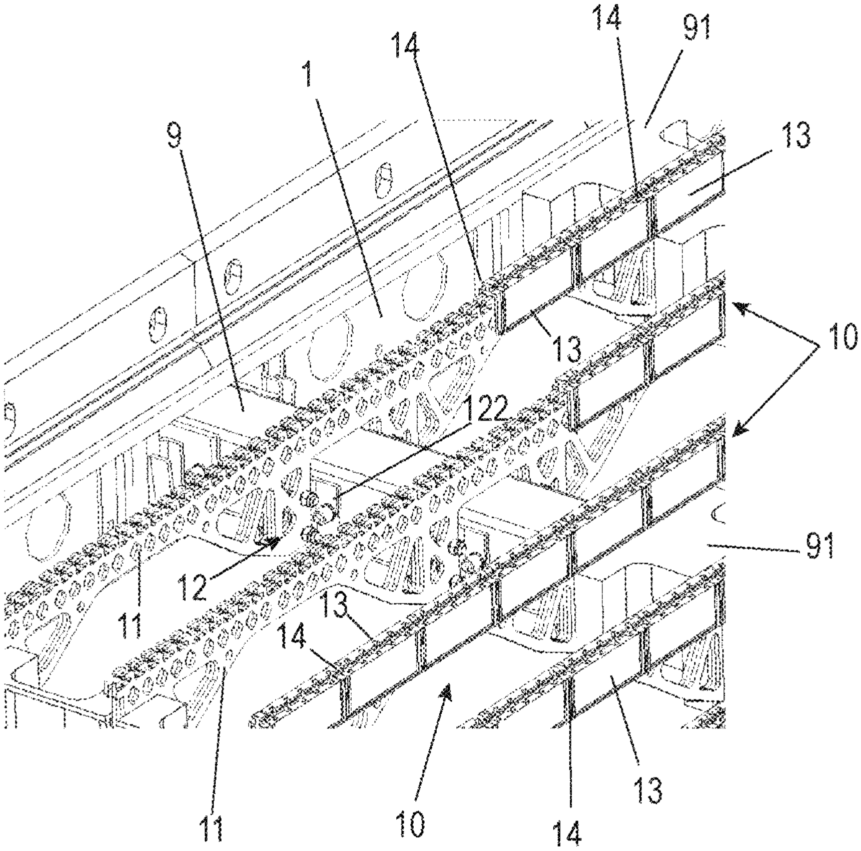
FIG. 4 shows a detailed isometric view of a section of a vibrating sieving machine with a disassembled sieve tray and a partially disassembled mounting system of the sieve tray in a further exemplary embodiment.
Figure 5:
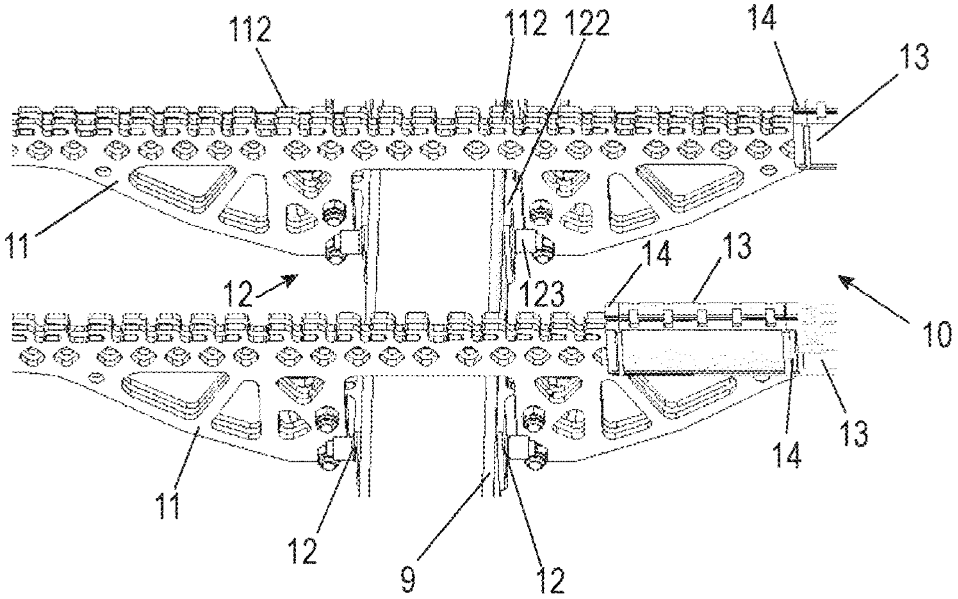
FIG. 5 shows a detailed view of a section of FIG. 4 from a different angle.

FIGS. 4 and 5 show an alternative mounting system 10 in a similar way to FIGS. 2 and 3. The basic structure is comparable to that of the exemplary embodiment in FIGS. 2 and 3, the description of which is hereby referred to. In particular, the attachment of the longitudinal beams 10 to the cross-beams 9 is different.

In the example shown, the longitudinal beams 11 are curved on their underside so that they extend like bridge arches between the cross-beams 9. This achieves a high load-bearing force while at the same time minimizing weight. A recess is provided in the area of each of the cross-beams 9. Mounting profiles 122, which in the case shown have a T-shaped profile and are bolted to the longitudinal beams 10, are used as fastenings 12. In each case, two of the mounting profiles 122 rest against opposite side cheeks of a cross-beam 9. The lateral "pincer-like" arrangement of the mounting profiles 12 saves installation height compared to an arrangement at the top of the cross-beam 9. Adhesive bonding is carried out, for example, using conventional structural adhesives for bonding thicker sheet metal structures.

The mounting profiles 122 are bonded to the side cheeks of the cross-beams 9 and in this example are additionally pretensioned and/or secured with rivets 123. The rivets 123 limit the expansion of the bond in the event of short-term overloading and thus protect it from damage.

During operation of the sieving machine, only acceleration forces acting perpendicular to the screening plane are transmitted between the cross-beams 9 and the longitudinal beams 11. Forces in the longitudinal direction are transmitted to the bonding surface by an alternating compressive load. By bonding the mounting profiles 122 to the side cheeks of the cross-beams 9, only shear forces act on the bonding surface during operation of the sieving machine, which means that the longitudinal beams 11 can be securely fastened with the adhesive bond.

Adhesive bonding can be advantageous compared to other fastenings, as it does not weaken the cross-beam 9. This also makes it easier to replace the longitudinal strips 11 as they can be removed. Welded seams, for example, can have an influence on the stability of the cross-beam due to their notch effect.

In the case of purely riveted or screwed fastening of the mounting profiles 112, micro-movements induced by the screen movement occur between the cross-beams 9 and the mounting profiles 112, which in the long term leads to damage to the usual corrosion protection layer and thus to corrosion at the fastening points. These detrimental micro-movements are effectively prevented by the adhesive bond.

FIGS. 6-8*c* show a further exemplary embodiment of a mounting system 10 for mounting sieve tray units. The mounting system 10 shown in these figures differs in its geometry and details from those shown in FIGS. 2 to 5. However, the basic structure of both is comparable and details of one or the other design can be transferred to the other.

FIG. 6 shows a sectional view in the longitudinal direction of the sieve deck through a section of the mounting system 10, which is placed on a cross-beam 9 and which comprises longitudinal beams 11, support bars 13, and wedge elements 14. In this sectional view, it can be seen that the longitudinal beam 11 has a support surface 111, which in this exemplary embodiment is not provided with openings for weight reduction, but could be. Each of the longitudinal beams 11 can be made from one or more sheets arranged parallel to each other and cut accordingly. The metal sheets can be punched or produced using a laser machining process.

Along the upper edge of the longitudinal beams 11, the sheets are formed in the shape of a large number of undercut hooks 112. Corresponding grooves or undercuts 113 are formed under the hooks.

Figure 7B:
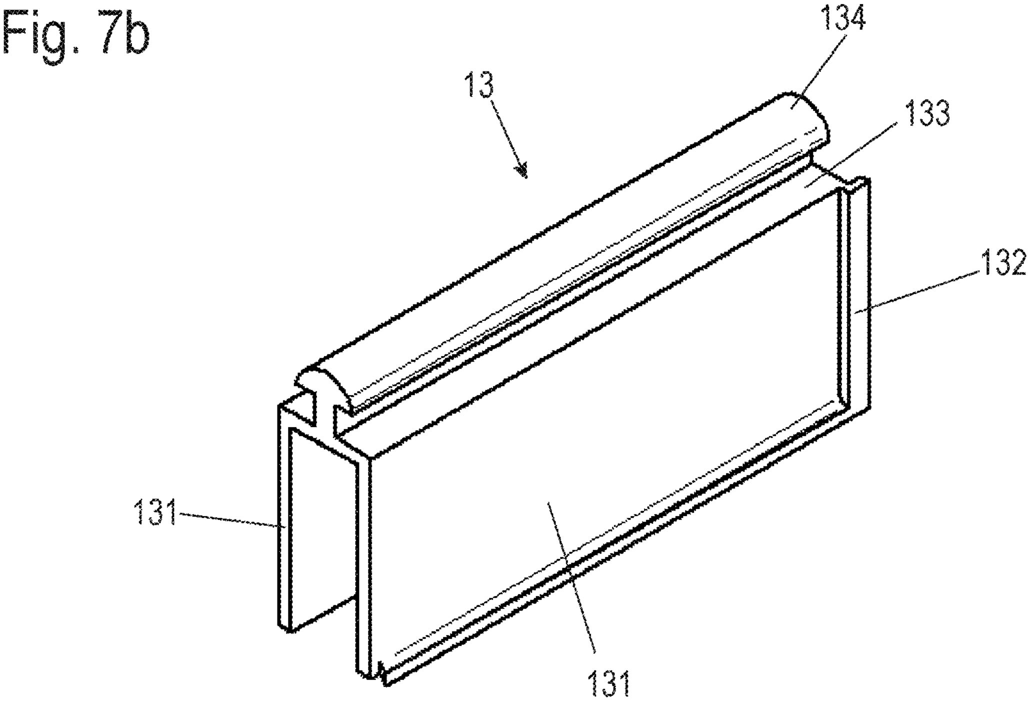

FIGS. 7*a* and 7*b* show the two different support elements of the mounting system 10 that are placed on the longitudinal beams 11, specifically the wedge element 14 in FIG. 7*a* and the support bar 13 in FIG. 7*b*. Both components, the support bar 13 and the wedge element 14, are preferably made of plastic using a plastic injection molding process. The support bar 13 has a length of around 15-30 cm, i.e., a length that can still be produced easily and at low cost using a plastic injection molding process. The wedge element 14 has an overall length of a few centimeters and can therefore be produced just as easily by injection molding.

The support bar 13 is essentially U-shaped with two parallel side cheeks 131 and a base 133 connecting the two at their upper end. The resulting U-shaped cross-section allows the support bar to be placed over the longitudinal beam and thus shields it from abrasive screenings. Overlap strips 132 are formed on the edge of the side walls, which cover gaps at the transition to an adjacent element, a further support bar 13 or a wedge element 14, and prevent screenings from getting between the support bar 13 or the wedge element 14 and the longitudinal beam 11.

A latching profile 134 is formed at the top of the base 133, which in this case is continuous in the longitudinal direction. By way of example, a mushroom head profile is used here as latching profile 134. In alternative designs, a differently shaped profile can also be used as the latching profile 134 instead of the mushroom head profile. Also, instead of a continuous profile, a plurality of profile elements, for example mushroom heads, can be arranged on the upper side of the base 133.

With a shorter overall length, the wedge element 14 has essentially the same geometry as the support bar 13. The wedge element 14 is also U-shaped with two parallel side cheeks 141 and a base 143 that connects at the top. The side cheeks 141 are also provided with overlapping strips 142. A head profile 144, which is comparable to the latching profile 134, is formed in the middle of the base. In addition, the wedge element 14 has a downward-pointing wedge 145 in the upper area of the side cheeks 141.

FIG. 8*a* shows an overall isometric view of an arrangement of support bars 13 and wedge elements 14 arranged one behind the other. Support bar 13 and wedge element 14 alternate with one another, with the overlapping strips 132 and 142 overlapping the side cheek 131, 141 of the adjacent element. FIG. 8*b* shows this overlapping area in an enlarged view.

Finally, FIG. 8*c* shows a sectional view in a vertical longitudinal section through the arrangement of FIG. 8*a*. In this sectional view, it can be seen that a plurality of projections 135 is formed on the inside of the side cheeks 131 of the support bars 13.

To mount the support bar 13 on the longitudinal beam 11, the support bar 13 is positioned so that the projections 135 are located between the hooks 112 of the longitudinal beam 11. In this position, the support bar 13 is pressed down until its base 133 rests on the inside on the top of the hooks 112. The support bar 13 is then moved against the opening direction of the hooks on the longitudinal beam 11 so that the projections 135 engage in the undercuts 113 of the hooks 112, as can also be seen in FIG. 6.

A wedge element 14 is then inserted from above onto the longitudinal beam 11 in front of a support bar 13 fitted in this way, wherein the wedge 145 rests on a rear edge on the non-opened side of a hook 112 and thus prevents the support bar 13 from being pushed out in the direction of the opening of the hook 112. The support bar 13 is thus wedged by the wedge element 15 in such a way that it is fixed on the longitudinal beam 11 in all spatial directions. A next support bar 13 then joins the inserted wedge element 14.

After mounting the support bars 13 or wedge elements 14 on the longitudinal beams 11, the sieve tray unit (see reference sign 8 in FIGS. 1*a*, 1*b*) is placed on the mounting system 10 and latches into place with the latching profile 134 of the support bars 13. The mounted sieve tray unit prevents the wedge elements 14 from moving upwards, so that the entire mounting system 10 is positively secured with the sieve tray unit in place.

The type of attachment of the support bars 13 and wedge elements 14 to the longitudinal beams 11 described in connection with FIGS. 6-8*c* is also implemented in this way in the exemplary embodiments of FIGS. 2-5.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Sieve box
2 Bracket
3 Spring assembly
4 Eccentric drive
5 Sieve deck
6 Feed area
7 Discharge area
8 Sieve tray unit
9 Cross-beam
91 Cover
10 Mounting system
11 Longitudinal beam
111 Support surface
112 Hook
113 Groove
12 Fastening the longitudinal beams
121 Weld seam
122 Mounting profile
123 Rivet
13 Support bar
131 Side cheek
132 Overlap strip
133 Base
134 Latching profile
135 Projection
14 Wedge element
141 Side cheek
142 Overlap strip
143 Base
144 Head profile
145 Wedge

The invention claimed is:

1. A sieving machine comprising:
at least one sieve deck; and
a mounting system,
wherein the at least one sieve deck has a plurality of insertable sieve deck elements fastened to cross-beams of the sieving machine by the mounting system,
wherein the mounting system comprises longitudinal beams mounted on the cross-beams and a plurality of support bars extending along the longitudinal beams and with which the plurality of insertable sieve deck elements latch,
wherein the plurality of support bars have a U-shaped cross-section and are fitted over the longitudinal beams,
wherein the longitudinal beams include hooks engaging in a respective one of the plurality of support bars for fastening the respective one of the plurality of support bars to the longitudinal beams in a form-fitting manner.

2. The sieving machine of claim 1, wherein the longitudinal beams are made from a sheet metal and the hooks are cut free from the sheet metal at an upper edge of the longitudinal beams.

3. The sieving machine of claim 2, wherein the longitudinal beams are made of two or more sheets arranged parallel to each other.

4. The sieving machine of claim 1, wherein the hooks are arranged one behind another at regular intervals in a longitudinal direction of the longitudinal beams.

5. The sieving machine of claim 1, wherein the longitudinal beams have a length within a range of a distance between two of the cross-beams of the sieving machine, wherein the longitudinal beams each rest in a central section on one of the two cross-beams.

6. The sieving machine of claim 1, wherein the plurality of support bars have side cheeks with which the plurality of support bars rest against outer sides of the longitudinal beams, wherein inner sides of the side cheeks include projections that engage in the hooks.

7. The sieving machine of claim 1, wherein the plurality of support bars are made of plastic.

8. The sieving machine of claim 7, wherein the plurality of support bars have a length in the range from 10 to 100 cm and are manufactured as molded parts in a plastic injection molding process.

9. The sieving machine of claim 1, further comprising:

a wedge element arranged on one of the longitudinal beams adjacent to at least one of the plurality of support bars, wherein the wedge element engages with a vertically aligned wedge between two hooks.

10. The sieving machine of claim 9, wherein support bars of the plurality of support bars alternate with the wedge element along the longitudinal beams.

11. The sieving machine of claim 6, wherein an overlap strip is formed on each of the side cheeks of the plurality of support bars, wherein the overlap strip overlaps a gap to an adjacent support bar or an adjacent wedge element.

12. The sieving machine of claim 1, wherein the plurality of support bars have a continuous or interrupted latching profile towards a top of a respective one of the plurality of support bars.

13. The sieving machine of claim 1, wherein the plurality of longitudinal beams are attached to the transverse beams by an adhesive bond.

14. The sieving machine of claim 13, wherein the adhesive bonding is on side cheeks of the cross-beams.

15. The sieving machine of claim 1, configured as a vibrating sieving machine with an eccentric drive.

* * * * *